United States Patent
Kani et al.

(10) Patent No.: US 8,304,124 B2
(45) Date of Patent: Nov. 6, 2012

(54) HYDROGEN GENERATOR, FUEL CELL SYSTEM, AND METHODS FOR OPERATING THEM

(75) Inventors: Yukimune Kani, Osaka (JP); Kunihiro Ukai, Nara (JP); Seiji Fujihara, Osaka (JP); Hidenobu Wakita, Kyoto (JP)

(73) Assignee: Panasonic Corporation, Osaka (JP)

( * ) Notice: Subject to any disclaimer, the term of this patent is extended or adjusted under 35 U.S.C. 154(b) by 940 days.

(21) Appl. No.: 12/304,159

(22) PCT Filed: Jun. 19, 2007

(86) PCT No.: PCT/JP2007/062344
§ 371 (c)(1),
(2), (4) Date: Dec. 10, 2008

(87) PCT Pub. No.: WO2007/148699
PCT Pub. Date: Dec. 27, 2007

(65) Prior Publication Data
US 2009/0269629 A1    Oct. 29, 2009

(30) Foreign Application Priority Data
Jun. 20, 2006 (JP) .................................. 2006-170006

(51) Int. Cl.
*H01M 8/04* (2006.01)
(52) U.S. Cl. ........................................ 429/428
(58) Field of Classification Search .................. 429/428
See application file for complete search history.

(56) References Cited

U.S. PATENT DOCUMENTS
2002/0071976 A1*  6/2002  Edlund ........................ 429/19
2004/0146763 A1*  7/2004  Pondo et al. ................ 429/26

FOREIGN PATENT DOCUMENTS
| JP | 2002-358992 | | 12/2002 |
| JP | 2004-116934 | * | 4/2004 |
| JP | 2004-228016 | | 8/2004 |
| JP | 2005-206395 | | 8/2005 |
| JP | 2006-008459 | | 1/2006 |
| JP | 2006-278120 | | 10/2006 |

* cited by examiner

*Primary Examiner* — Ula C Ruddock
*Assistant Examiner* — Jacob Marks
(74) *Attorney, Agent, or Firm* — McDermott Will & Emery LLP

(57) ABSTRACT

A hydrogen generator (100) includes: a desulfurizer (4) having a desulfurizing agent which removes by adsorption a sulfur compound in a raw material; a reformer (1) having a reforming catalyst which generates a hydrogen-containing gas from the raw material; a combustor (5) which heats the reformer (1); and an ignitor (103) which ignites the raw material in the combustor (5), is configured to start combustion of the combustor (5) by using the raw material passed through the desulfurizer (4), and further includes: an upper limit changing device (8) which changes an upper limit of an ignition confirmation time of the ignitor (103); and a change instruction receiving device (101) which receives a signal related to an instruction of the change.

4 Claims, 11 Drawing Sheets

HYDROGEN GENERATOR, FUEL CELL SYSTEM, AND METHODS FOR OPERATING THEM

RELATED APPLICATIONS

This application is the U.S. National Phase under 35 U.S.C. §371 of International Application No. PCT/JP2007/062344, filed on Jun. 19, 2007, which in turn claims the benefit of Japanese Application No. 2006-170006, filed on Jun. 20, 2006, the disclosures of which Applications are incorporated by reference herein.

TECHNICAL FIELD

The present invention relates to a hydrogen generator which includes a desulfurizer which removes by adsorption a sulfur compound, and generates a hydrogen-containing gas by a reforming reaction from a raw material passed through the desulfurizer, a fuel cell system including the hydrogen generator, and methods for operating them.

BACKGROUND ART

A fuel cell capable of generating electric power with high efficiency even if the fuel cell is small has been developed as an electric power generator of a distributed energy supply source. However, systems for supplying a hydrogen gas used as fuel during this electric power generation is not developed as a common infrastructure. Therefore, for example, a hydrogen generator which generates a hydrogen-containing gas from a raw material obtained from an existing fossil material infrastructure, such as city gas or LPG, is disposed with the fuel cell. In many cases, the hydrogen generator includes: a reformer which causes a reforming reaction between the raw material and water; a shifter which causes a water gas shift reaction between carbon monoxide and steam in order to reduce the concentration of the carbon monoxide in the hydrogen-containing gas; and a CO remover which oxidizes the carbon monoxide mainly by an oxidizing agent, such as a slight amount of air. Moreover, catalysts suitable for respective reactions are used in respective reaction portions, i.e., for example, a Ru catalyst or a Ni catalyst is used in the reformer, a Cu–Zn catalyst is used in the shifter, and a Ru catalyst or the like is used in the CO remover.

In order to detect leakage of the raw material from a pipe and the like, a sulfur compound based odorant is added to the city gas or the LPG which is the above existing infrastructure. Since the sulfur compound based odorant is a component which poisons the catalyst used in the hydrogen generator, it is common to dispose the desulfurizer, which removes the odorant, in the hydrogen generator in advance.

For example, a method for removing the sulfur compound in the raw material by an adsorptive desulfurizer which uses a zeolite based adsorptive desulfurizing agent has been devised (see Patent Document 1 for example).

Moreover, since the adsorptive desulfurizer can remove by adsorption the sulfur compound at normal temperature, it excels in a start-up property of the hydrogen generator as compared to a hydro-desulfurizer. However, the sulfur compound in the raw material is supplied at all times, and an adsorptive desulfurization performance of the desulfurizer deteriorates when the period of use of the desulfurizer becomes long. To be specific, since the adsorptive desulfurization performance (adsorption capacity) of the desulfurizer is limited, the desulfurizer needs to be replaced when using it for a long period of time. Here, a desulfurizer having an indicator function capable of easily determining when to replace the desulfurizer has been proposed (see Patent Document 2 for example).

Moreover, the hydrogen generator typically includes a combustor capable of increasing the temperature of the catalyst in a reformer to a level suitable for a catalytic reaction. In a start-up operation of the hydrogen generator, the inside of the reformer is purged by the raw material supplied from a raw material infrastructure and passed through the desulfurizer, and the combustion of the combustor is carried out by using the raw material after the purge (see Patent Document 3 for example).

Patent Document 1: Japanese Laid-Open Patent Application Publication 2004-228016
Patent Document 2: Japanese Laid-Open Patent Application Publication 2002-358992
Patent Document 3: Japanese Laid-Open Patent Application Publication 2005-206395

DISCLOSURE OF THE INVENTION

Problems to be Solved by the Invention

As in the hydrogen generator described in Patent Document 2, since the adsorption capacity of the adsorptive desulfurizer is limited, it is essential to replace the desulfurizer. However, in a case where the combustion of the combustor is carried out by using the raw material passed through the desulfurizer as in the hydrogen generator described in Patent Document 3, after the replacement of the desulfurizer, the raw material may adsorb to the desulfurizing agent, so that the amount of the raw material having passed through the desulfurizer and to be supplied to the combustor may temporarily decrease. Thus, the combustion of the combustor may become unstable. As a result, for example, in the case of applying a normal combustion detection criterion, the unstable combustion of the combustor due to the adsorption of the raw material in the desulfurizer may be erroneously determined as a combustion failure caused due to the other factor of the combustor.

The present invention was made in view of these circumstances, and an object of the present invention is to provide a hydrogen generator capable of, in a case where combustion of a combustor is started by using a raw material passed through an adsorptive desulfurizer, appropriately starting the combustion without erroneously determining the combustion as a combustion failure even in a start-up operation after replacement of the desulfurizer, a fuel cell system including the hydrogen generator, and methods for operating them.

Means for Solving the Problems

In order to solve the above problems, a hydrogen generator of the present invention includes: a desulfurizer including a desulfurizing agent which removes by adsorption a sulfur compound in a raw material; a reformer including a reforming catalyst which generates a hydrogen-containing gas from the raw material; a combustor which heats the reformer; and an ignitor which ignites the raw material in the combustor, the hydrogen generator being configured to start combustion in the combustor by using the raw material passed through the desulfurizer, the hydrogen generator further including: an upper limit changing device which changes an upper limit of an ignition confirmation time of the ignitor; and a change instruction receiving device which receives a signal related to an instruction of the change.

Moreover, the change instruction receiving device may be a replacement signal receiving device which receives a signal related to replacement of the desulfurizer, and the upper limit changing device may increase the upper limit of the ignition confirmation time when the replacement signal receiving device receives the signal related to the replacement of the desulfurizer.

With this configuration, in the case of starting the combustion of the combustor by using the raw material passed through the adsorptive desulfurizer, the combustion can be appropriately started without erroneously determining the combustion as the combustion failure even in the start-up operation of the hydrogen generator after the replacement of the desulfurizer.

Moreover, a fuel cell system of the present invention may include: the hydrogen generator of the present invention; and a fuel cell which generates electric power by using the hydrogen-containing gas supplied from the hydrogen generator.

Moreover, a method for operating a hydrogen generator of the present invention is a method for operating a hydrogen generator including: a desulfurizer including a desulfurizing agent which removes by adsorption a sulfur compound in a raw material; a reformer including a reforming catalyst which generates a hydrogen-containing gas from the raw material passed through the desulfurizer; a combustor which heats the reformer; and an ignitor which ignites the raw material in the combustor, the hydrogen generator being configured to start combustion in the combustor by using the raw material passed through the desulfurizer, the method including the steps of: increasing an upper limit of an ignition confirmation time of the ignitor after replacement of the desulfurizer; and carrying out an ignition operation of the ignitor based on the increased upper limit of the ignition confirmation time.

Moreover, a method for operating a fuel cell system of the present invention is a method for operating a fuel cell system including: a hydrogen generator including a desulfurizer having a desulfurizing agent which removes by adsorption a sulfur compound in a raw material, a reformer including a reforming catalyst which generates a hydrogen-containing gas from the raw material passed through the desulfurizer, a combustor which heats the reformer, and an ignitor which ignites the raw material in the combustor, the hydrogen generator being configured to start combustion in the combustor by using the raw material passed through the desulfurizer; and a fuel cell which generates electric power by using the hydrogen-containing gas supplied from the hydrogen generator, the method including the steps of: increasing an upper limit of an ignition confirmation time of the ignitor after replacement of the desulfurizer; and carrying out an ignition operation of the ignitor based on the increased upper limit of the ignition confirmation time.

In accordance with these methods, in the case of starting the combustion of the combustor by using the raw material passed through the adsorptive desulfurizer, the combustion can be appropriately started without erroneously determining the combustion as the combustion failure even in the start-up operations of the hydrogen generator and the fuel cell system after the replacement of the desulfurizer.

The above object, other objects, features and advantages of the present invention will be made clear by the following detailed explanation of a preferred embodiment with reference to the attached drawings.

Effects of the Invention

In accordance with the present invention, it is possible to realize a hydrogen generator capable of, in a case where combustion of a combustor is started by using a raw material passed through an adsorptive desulfurizer, appropriately starting the combustion without erroneously determining the combustion as a combustion failure even in a start-up operation after replacement of the desulfurizer, a fuel cell system including the hydrogen generator, and methods for operating them.

Figure 1:
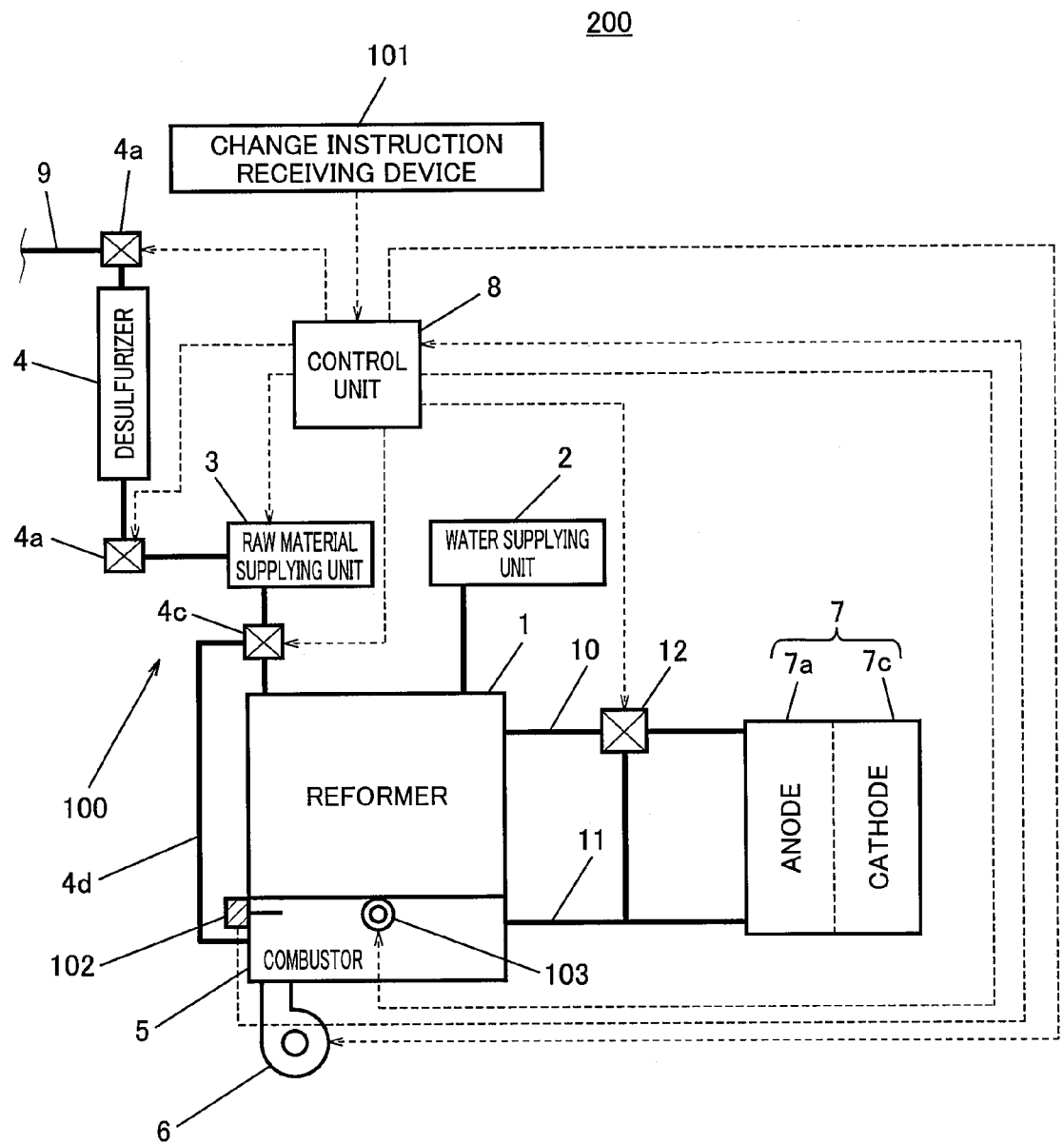
FIG. 1 is a block diagram showing a configuration example of a fuel cell system in an embodiment of the present invention.

EXPLANATION OF REFERENCE NUMBERS 1 reformer
2 water supplying unit
3 raw material supplying unit
4 desulfurizer
4a shut-off valve
5 combustor
6 combustion fan
7 fuel cell
8 control unit
9 gas infrastructure line
10 hydrogen gas supplying passage
11 off gas passage
12 passage changing valve
50 distributor
51 air chamber
52 combustion space
53 wall portion
101 change instruction receiving device
102 combustion detector (flame rod; FR)
103 ignitor
100 hydrogen generator
200 fuel cell system

BEST MODE FOR CARRYING OUT THE INVENTION

Hereinafter, a preferred embodiment of the present invention will be explained in reference to the drawings.

FIG. 1 is a block diagram showing a configuration example of a fuel cell system in the embodiment of the present invention. As shown in FIG. 1, a fuel cell system 200 includes a hydrogen generator 100 and a fuel cell 7 as main components.

The hydrogen generator 100 is a device which can progress a reforming reaction between a raw material and steam to generate a hydrogen-containing gas. The raw material contains an organic compound made of at least carbon and hydrogen. Examples of the organic compound are hydrocarbon, such as city gas, natural gas, or LPG, containing methane as a major component, an alcohol, such as methanol, and a naphtha component. The hydrogen generator 100 includes a reformer 1 in which a Ru based reforming catalyst is filled, and may include a shifter having a Cu—Zn based shift catalyst which causes a steam shift reaction with carbon monoxide in the hydrogen-containing gas generated in the reformer 1, and a CO remover having a Ru based catalyst which reduces mainly by oxidation the carbon monoxide remaining in the hydrogen-containing gas having passed through the shifter (Note that the shifter and the CO remover are not shown, and detailed explanations thereof are omitted).

Moreover, as shown in FIG. 1, the hydrogen generator 100 includes, in addition to the reformer 1, a water supplying unit 2, a raw material supplying unit 3, a desulfurizer 4, a combustor 5, a control unit 8, and a change instruction receiving device 101.

The water supplying unit 2 is a device which has a function of adjusting the flow rate of water supplied to the reformer 1. The water is used to generate the steam necessary for the reforming reaction. Used as the water supplying unit 2 is a valve, a flow control device, a pump, or the like which adjusts the amount of water supplied from a water supply source (not shown), such as a city water or a water tank. In the present embodiment, purified water obtained by purifying the city water through activated carbon and ion-exchange resin (both of which are not shown) is supplied to the reformer 1 by the water supplying unit 2.

The raw material supplying unit 3 is a device (for example, a valve or a flow rate adjuster) which has a function of adjusting the flow rate of the raw material supplied to the reformer 1. As shown in FIG. 1, by using a passage changing valve 4c (three-way valve for example) disposed at a connecting portion where a passage extending between the raw material supplying unit 3 and the reformer 1 and a bypass 4d are connected to each other, the raw material discharged from the raw material supplying unit 3 can be directly supplied to the below-described combustor 5 through the bypass 4d without flowing through the reformer 1.

The desulfurizer 4 has an adsorptive desulfurization function and is filled with zeolite (Zeorum F-9 produced by Tosoh Corporation is used in the present embodiment) that is an absorbent of a sulfur compound. A pair of shut-off valves 4a are disposed on both ends which are an entrance and an exit, respectively, of the desulfurizer 4. One of the shut-off valves 4a is connected to a gas infrastructure line 9 which is a supply source of the raw material, and the other one is connected to the raw material supplying unit 3. The raw material containing the sulfur compound based odorant is supplied from the gas infrastructure line 9 to the desulfurizer 4 by opening the shut-off valves 4a, the sulfur compound is removed by adsorption from the raw material in the desulfurizer 4, and the raw material is supplied to the raw material supplying unit 3.

The combustor 5 is a device having a flame burner configuration which supplies heat necessary for the reforming reaction to the reforming catalyst of the reformer 1 by a high-temperature combustion gas. The combustor 5 is provided with a combustion detector 102, an ignitor 103, and a combustion fan 6 for supplying combustion air. Note that a detailed configuration of the combustor 5 will be described later.

The control unit 8 is constituted by a microprocessor (CPU) and the like. As shown in FIG. 1, the control unit 8 can control the operation of the fuel cell system 200 (hydrogen generator 100), and cause an internal memory thereof, such as a semiconductor memory, to store operation parameters and control programs of the fuel cell system 200. To be specific, the control unit 8 (CPU) receives output signals of the change instruction receiving device 101 and the combustion detector 102 and output signals of a temperature sensor and a pressure sensor, both of which are not shown, and appropriately controls the operations of the raw material supplying unit 3, the water supplying unit 2, the combustion fan 6, the ignitor 103, and various valves 4a, 4c, and 12 based on the above signals.

The change instruction receiving device 101 is configured to receive a signal related to an instruction of changing an upper limit of an ignition confirmation time when starting combustion in the combustor 5. In the present embodiment, the change instruction receiving device 101 includes a touch-panel-type operation screen, and the above-described signals can be received by a predetermined operation of touching the screen with fingers of a maintenance operator or a user (hereinafter referred to as "operator") or with a dedicated pen. Details of the change instruction receiving device 101 will be described later.

Moreover, as shown in FIG. 1, the fuel cell 7 of a polymer electrolyte type is configured to include an anode 7a and a cathode 7c and generate electric power by using a hydrogen gas supplied from the hydrogen generator 100 to the anode 7a through a hydrogen gas supplying passage 10 and an oxidizing gas supplied from a suitable oxidizing gas supplying unit (not shown) to the cathode 7c. Since the configuration of the fuel cell 7 is known, details thereof are not shown, and a detailed explanation thereof is omitted. Note that the fuel cell 7 is configured such that a hydrogen off gas remaining at the time of electric power generation of the fuel cell 7 is discharged from the anode 7a and supplied to the combustor 5 through an off gas passage 11. Moreover, as shown in FIG. 1, a short-circuit passage which realizes short-circuiting between the hydrogen gas supplying passage 10 and the off gas passage 11 is formed, and a passage changing valve 12 (three-way valve for example) is disposed at a connecting portion where the short-circuit passage and the hydrogen gas supplying passage 10 are connected to each other. With this, in a case where the inside of the hydrogen generator 100 (herein, the insides of the reformer 1, the shifter (not shown), and the CO remover (not shown)) is purged at the time of, for example, start-up of the hydrogen generator 100 by using a combustible material gas supplied from the raw material supplying unit 3, the combustible gas (the material gas and the hydrogen gas) after the purge can be directly supplied to the combustor 5 without flowing through the fuel cell 7, and can be combusted in the combustor 5.

Next, the configuration of the combustor 5 will be explained in detail.

Figure 2:
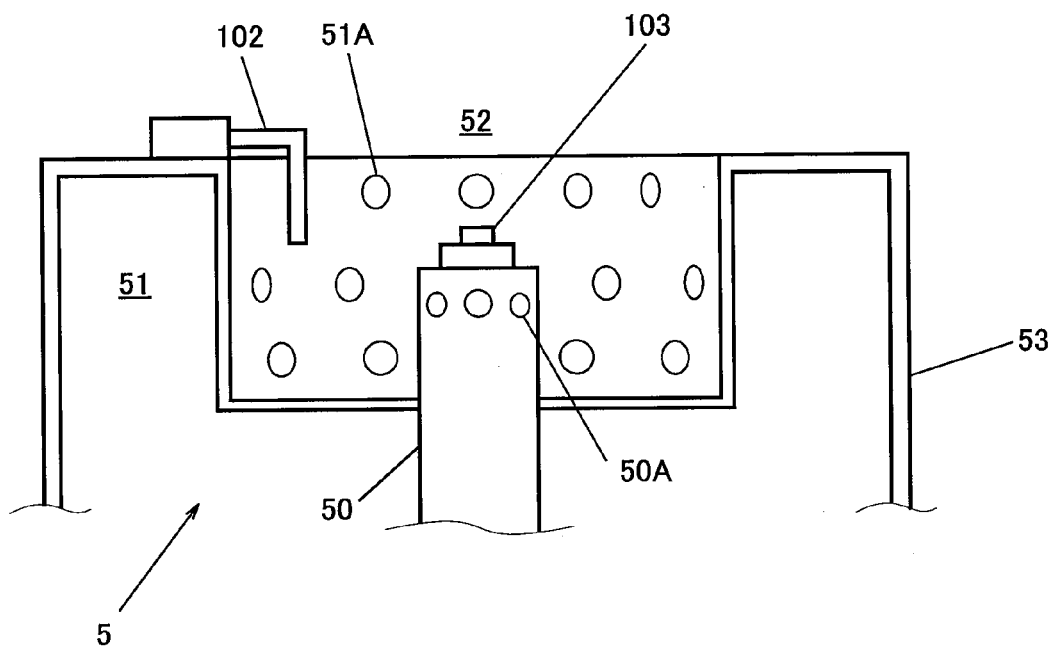
FIG. 2 is a schematic diagram for explaining a configuration example of a combustor of FIG. 1.

FIG. 2 is a schematic diagram for explaining the configuration example of the combustor of FIG. 1.

As shown in FIG. 2, a tubular distributor 50 of the combustor 5 is communicated with the bypass 4d and the off gas passage 11, and includes a large number of ejection holes 50A through which a combustible component (raw material for example) can be ejected to a combustion space 52. With this, the combustible component flowing in the distributor 50 is ejected to the combustion space 52 dispersively through the ejection holes 50A.

Moreover, an air chamber 51 of the combustor 5 is communicated with the inside of the combustion fan 6 via a wall portion 53, and includes a large number of ejection holes 51A through which air supplied with pressure from the combustion fan 6 can be ejected to the combustion space 52. With this, the air in the air chamber 51 is ejected to the combustion space 52 dispersively through the ejection holes 51A.

Thus, the combustible component and the air are supplied to the combustion space 52 in an appropriate mixing ratio.

As shown in FIG. 2, the ignitor 103 is provided at a tip end of the distributor 50. With this, the combustible component in the combustion space 52 can be ignited. In the present embodiment, used as the ignitor 103 is an ignitor which utilizes piezoelectric discharge.

Moreover, the combustion detector 102 is disposed at the combustion space 52. With this, it is possible to detect a condition of flame combustion of the combustor 5. In the present embodiment, used as the combustion detector 102 is a flame rod (FR) which measures the amount of ion current of charged particles in the combustion space 52 (hereinafter "combustion detector 102" is referred to as "flame rod 102").

Next, one example of the start-up operation of the hydrogen generator 100 and the fuel cell system 200 (hereinafter referred to as "the hydrogen generator 100 and the like") of the present embodiment will be explained.

First, an ignition sequence of the combustor 5 in a case where it is assumed that the desulfurizer 4 is not replaced will be described.

Figure 3:
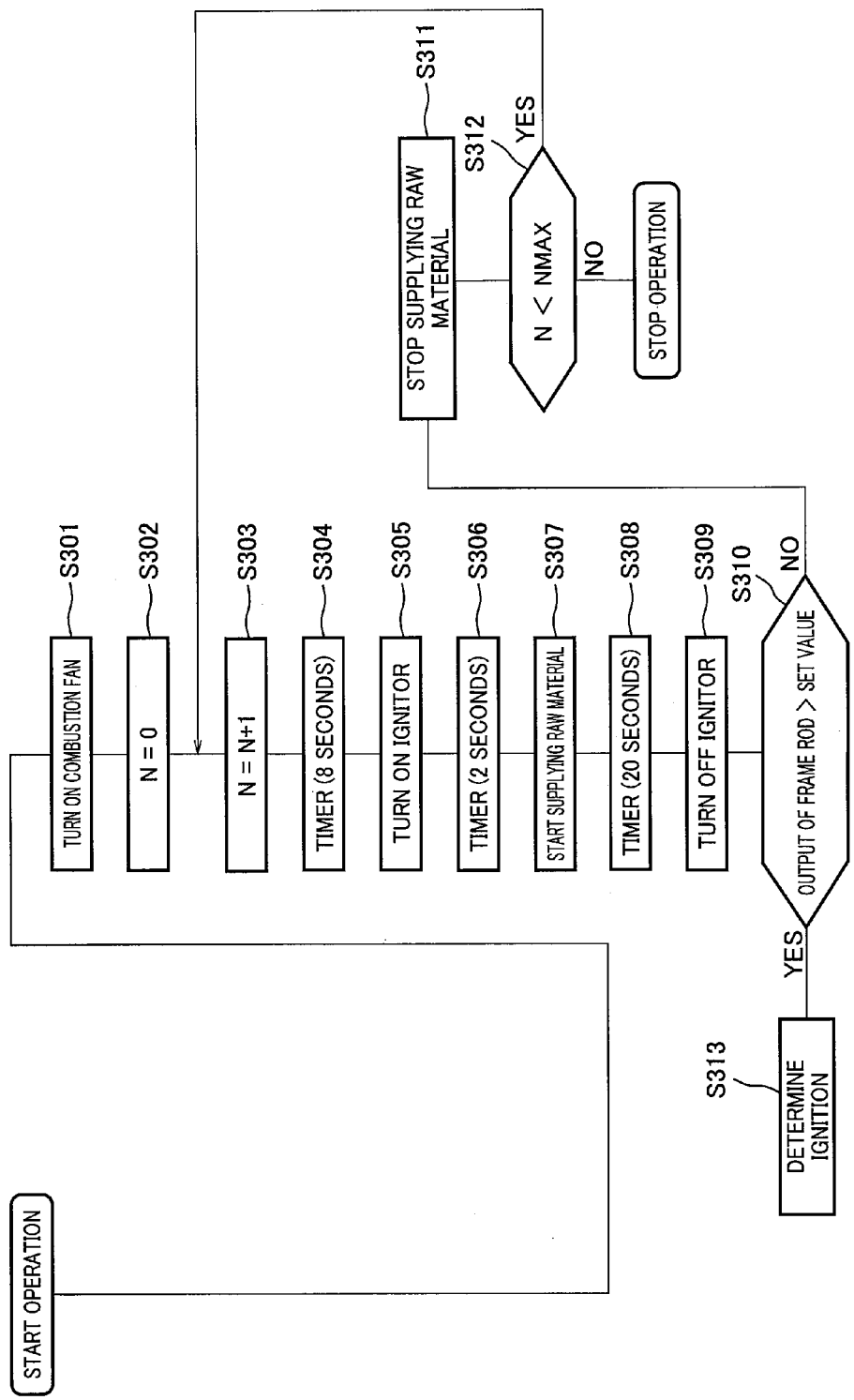
FIG. 3 is a flow chart showing one example of an ignition sequence of the combustor in a case where it is assumed that a desulfurizer is not replaced.

FIG. 3 is a flow chart showing one example of the ignition sequence of the combustor in a case where the replacement of the desulfurizer is not considered.

Figure 4:
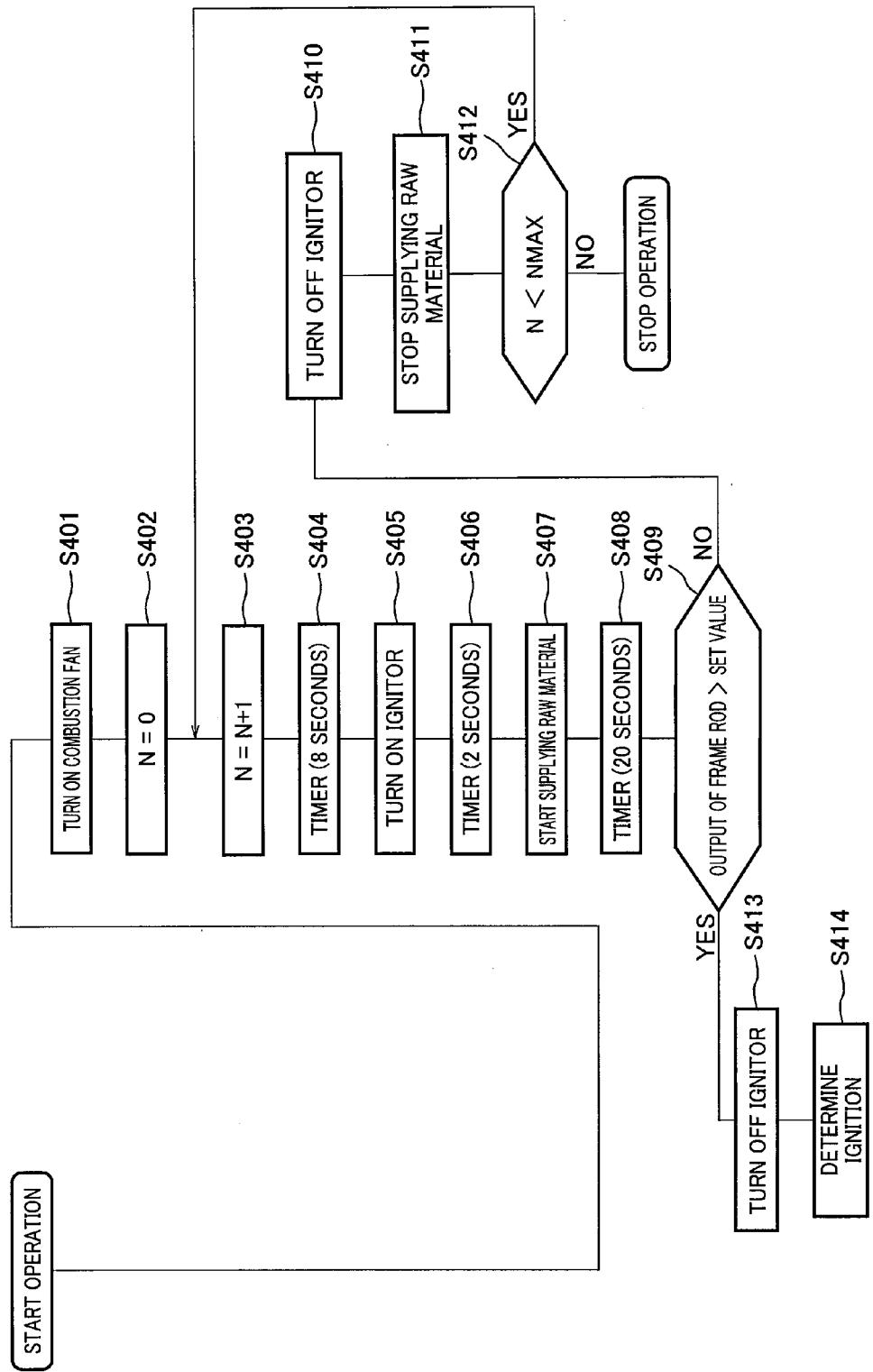
FIG. 4 is a flow chart showing another example of the ignition sequence of the combustor in a case where it is assumed that the desulfurizer is not replaced.

FIG. 4 is a flow chart showing another example of the ignition sequence of the combustor in a case where the replacement of the desulfurizer is not considered.

First, steps of the ignition sequence of FIG. 3 will be explained.

In the ignition sequence of FIG. 3, the control program stored in the internal memory of the control unit 8 is loaded by the CPU of the control unit 8. Then, the CPU controlled by the control program executes the following processing while controlling various devices, such as the hydrogen generator 100 and the like. Note that the internal memory of the control unit 8 prestores an upper limit "NMAX" of the number of times of the ignition which corresponds to the upper limit of "the ignition confirmation time" of the ignitor 103, and a "set value" output from the flame rod 102 which corresponds to a threshold (see FIG. 5 described below as one example) of a determination of the combustion of the combustor 5.

The combustion fan 6 is turned ON (Step S301). With this, the supply of the combustion air from the combustion fan 6 to the combustion space 52 is started.

Next, "N" which denotes the number of trials of ignition is reset to "0", and then, "1" is added to "N" (Steps S302 and S303). With this, a first ignition operation of the ignitor 103 is carried out in the following manner.

After a predetermined timer setting time (8 seconds here) from the start of the supply of the combustion air to the combustion space 52, the ignitor 103 is turned ON (Steps S304 and S305) to generate spark discharge in the combustion space 52.

In this state, after a predetermined timer setting time (2 seconds here), the supply of the raw material from the raw material supplying unit 3 through the bypass 4d to the combustion space 52 is started (Steps S306 and S307). To be specific, an appropriate amount of the raw material flowing through the distributor 50 is ejected to the combustion space 52 through the ejection holes 50A. With this, a mixture gas of the raw material and the combustion air enters into a combustible range, and is ready to generate the flame in the combustion space 52.

After a predetermined timer setting time (20 seconds here) from the start of the supply of the raw material to the combustion space 52, the ignitor 103 is turned OFF (Steps S308 and S309).

Here, it is determined whether or not the output of the flame rod 102 exceeds the "set value" corresponding to the threshold of the determination of the combustion of the combustor 5 (Step S310).

As above, it is determined whether or not the flame is appropriately generated in the combustor 5 based on the amount of ion current of the charged particles as the output of the flame rod 102.

When the output of the flame rod 102 exceeds the "set value" ("YES" in Step S310), it is determined that the raw material is ignited by the ignitor 103 (Step S313).

It is also confirmed that the above-described output (amount of ion current) is maintained at a constant value throughout a predetermined period of time. With this, the stability of the combustion of the combustor 5 is secured appropriately.

In this case, the process enters into a normal operation of the hydrogen generator 100 and the like, to be specific, the water is supplied to the reformer 1 by the water supplying unit 2, and the passage changing valve 4c is switched to supply the raw material to the reformer 1 from the raw material supplying unit 3. With this, the hydrogen-containing gas is generated in the reformer 1 from the raw material and the steam by the steam-reforming reaction. Note that the amount of water supplied is adjusted such that the number of moles of water molecules in the water supplied per unit time is three times as large as the number of moles of carbon atoms of a raw material average composition in the raw material supplied per unit time. In the present embodiment, the city gas containing methane as the major component is used as the raw material, and the amount of water supplied is set such that three moles of the steam exist with respect to one mole of the carbon atom in an average composition of the city gas (steam to carbon ratio (S/C)=3). The hydrogen-containing gas discharged from the reformer 1 is subjected to a water gas shift reaction in the shifter and a selective oxidation reaction of the carbon monoxide in the CO remover. With this, the hydrogen gas whose carbon monoxide concentration is about 20 ppm or lower is generated. The hydrogen gas is supplied to the anode 7a of the fuel cell 7 through the hydrogen gas supplying passage 10, and used as a reactant gas for electric power generation of the fuel cell 7.

On the other hand, when the output of the flame rod 102 is the "set value" or less in Step S310, it is determined that the raw material is not ignited (ignition failure) by the ignitor 103.

In this case, the supply of the raw material to the combustion space 52 by using the raw material supplying unit 3 is stopped (Step S311). Then, it is determined whether or not "N" which denotes the number of trials of ignition is less than the upper limit "NMAX" of the number of times of the ignition (Step S312).

When "N" which denotes the number of trials of ignition is less than the upper limit "NMAX" of the number of times of the ignition ("YES" in Step S312), the process returns to Step S303, and a next ignition trial operation is carried out. When the supply of the raw material is stopped in Step S311, the inside of the combustion space 52 is filled with the air which is continuously supplied to the combustion space 52. On this account, even when the ignitor 103 is turned ON again in Step 305, irregular situations, such as abnormal combustion of the combustor 5, do not occur.

On the other hand, when "N" which denotes the number of trials of ignition is not less than the upper limit "NMAX" of the number of times of the ignition ("NO" in Step S312), it is determined that the combustor 5 is abnormal in some way other than the ignition failure of the ignitor 103 with respect to the raw material. Thus, the operations of the hydrogen generator 100 and the like are stopped.

Thus, by appropriately setting the upper limit "NMAX" of the number of times of the ignition in the ignition sequence of the combustor 5 of FIG. 3, it is possible to reduce the ignition failure of the ignitor 103 with respect to the raw material, and quickly deal with the abnormality of the combustor 5 other than the ignition failure. Moreover, since a detecting operation is carried out by the flame rod 102 after the ignitor 103 is turned OFF, the flame rod 102 is not affected by the operation (spark discharge) noise of the ignitor 103. Therefore, this is effective for the flame rod 102 which is easily affected by the noise.

Next, steps of the ignition sequence of FIG. 4 will be explained. Note that the following explanation is limited to the steps which are different from those of the ignition sequence of FIG. 3.

In the ignition sequence of FIG. 3, the ignitor 103 is turned OFF in Step S309 before it is determined whether or not the output of the flame rod 102 exceeds the "set value" corresponding to the threshold of the determination of the combustion of the combustor 5 (in Step S310).

However, in the case of using the flame rod 102 which excels in resistance to the operation noise of the ignitor 103, the detecting operation of the flame rod 102 may be executed while the ignitor 103 is in an ON state as shown in Step S409 of the ignition sequence of FIG. 4. After that, the ignitor 103 may be turned OFF in Step S410.

Here, a modification example of the ignition sequence of FIG. 4 will be explained without a flow chart. As the modification example of the ignition sequence of FIG. 4, the operation of turning OFF the ignitor 103 in Step S410 and the operation of stopping the supply of the raw material in Step S411 may be omitted, and the ON state of the ignitor 103 and the supply of the raw material by the raw material supplying unit 3 may be maintained while the ignition trial is repeatedly carried out. In this case, in the second and following ignition trials, the operation of turning ON the ignitor in Step 405 can also be omitted. Therefore, herein, to be precise, the upper limit "NMAX" of the number of times of the ignition is the upper limit "NMAX" of the number of times of repetition of the process of Step S403 to S412.

Next, the ignition sequence of the combustor 5 in a case where the replacement of the desulfurizer 4 is considered, which is a characteristic operation in the hydrogen generator 100 and the like of the present embodiment, will be described.

In a case where the desulfurizer 4 is not replaced, no problems occur in the ignition sequences of FIGS. 3 and 4. However, problems occur in a case where the desulfurizer 4 is replaced.

First, the problems which occur in the ignition sequences of FIGS. 3 and 4 when the desulfurizer 4 is replaced will be explained in detail in reference to the drawings.

Figure 5:
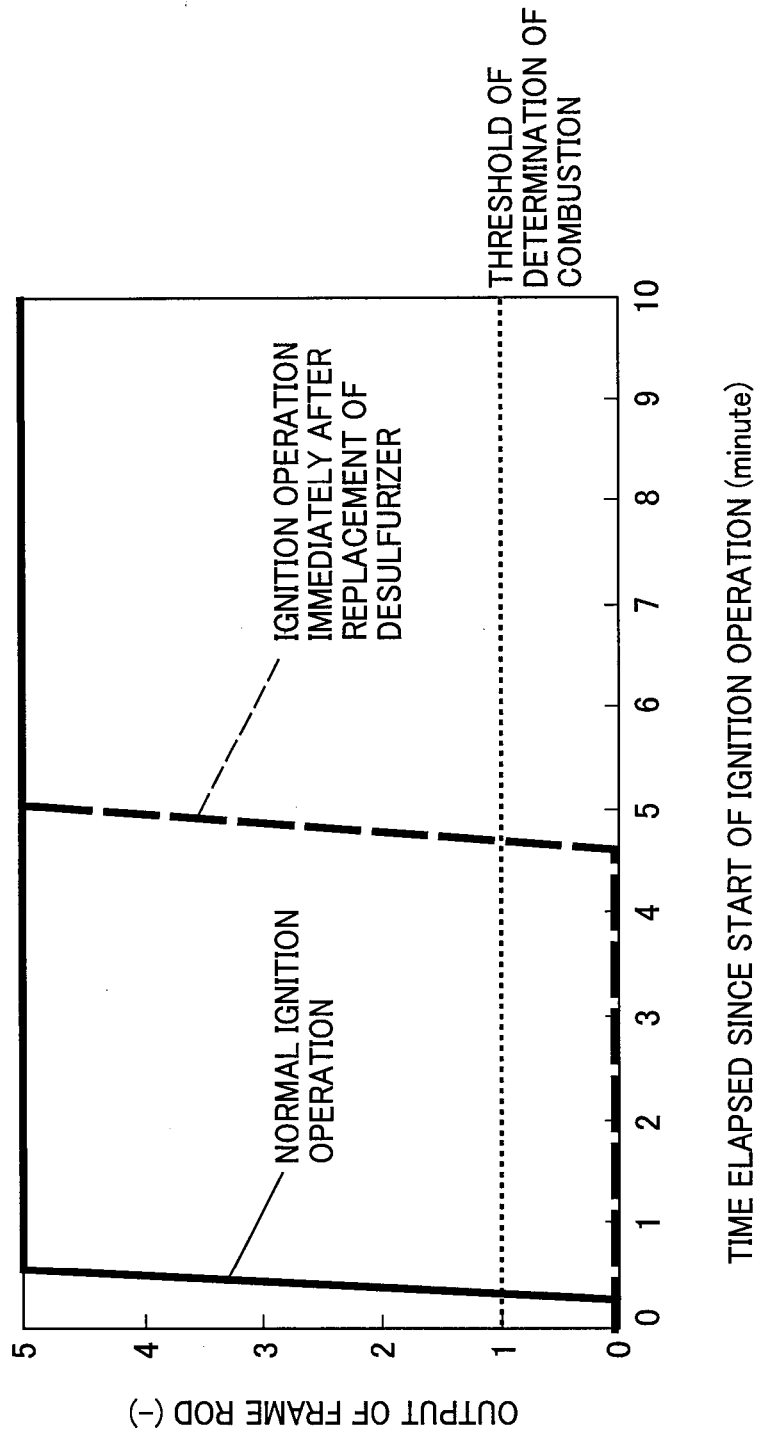
FIG. 5 is a diagram showing one measurement example of a time-lapse change of an output of a flame rod in an ignition operation of an ignitor.

FIG. 5 is a diagram showing one measurement example of a time-lapse change of the output of the flame rod in the ignition operation of the ignitor. Herein, it is assumed that the ignition operation of the ignitor 103 is continuously carried out.

In FIG. 5, a horizontal axis represents a time elapsed since the start of the ignition operation of the ignitor 103, and a vertical axis represents the output of the flame rod. FIG. 5 shows the relation between the elapsed time and the output of the flame rod in the case (shown by broken line) of the ignition operation of the first combustion operation after the replacement of the desulfurizer 4 and the relation between the elapsed time and the output of the flame rod in the case (shown by a solid line) of the ignition operation of the normal combustion operation. Note that the upper limit of the output of the flame rod is set to "5 (-)".

When the combustion of the raw material in the combustion space 52 is detected (that is, when the ignition of the raw material is detected), the output of the flame rod becomes more than "0". Moreover, when the output of the flame rod is "1 (-)" or more, it is thought that the combustion of the raw material in the combustion space 52 is stably carried out.

It is clear from FIG. 5 that a timing of when the output of the flame rod exceeds "1 (-)" is different between the case (shown by the broken line) of the ignition operation of the first combustion operation after the replacement of the desulfurizer 4 and the case (shown by the solid line) of the ignition operation of the normal combustion operation. To be specific, the ignition operation of the first combustion operation after the replacement of the desulfurizer 4 requires longer time to reach the timing of when the output of the flame rod exceeds "1 (-)" than the ignition operation of the normal combustion operation. Since the desulfurizing agent which is not exposed to the raw material after the replacement of the desulfurizer 4 has a high adsorption ability, the sulfur compound in the raw material and, in addition, a part of the raw material itself adsorb to the desulfurizing agent when the raw material flows first. Therefore, the amount of the raw material supplied to the combustion space 52 is reduced, and a time that elapses until the mixture gas of the raw material and the combustion air enters into the combustible range in the combustion space 52 (to be specific, time until the output of the flame rod exceeds "1 (-)") increases.

Here, the upper limit "NMAX" of the number of times of the ignition in a case where the ignitor 103 is turned ON and OFF can be estimated in the following manner based on a measured value of the elapsed time of the horizontal axis of FIG. 5 and a measured value of the output of the flame rod of the vertical axis of FIG. 5.

In the case of the ignition operation of the normal combustion operation which is shown by a solid line of FIG. 5, slight time loss occurs when the raw material discharged from the raw material supplying unit 3 reaches the combustor 5. Therefore, the output of the flame rod does not immediately rise in conjunction with the start of the ignition operation. However, the combustion of the raw material of the combustor 5 becomes stable within a short period of time from the start of the ignition operation. Therefore, in this case, it is anticipated that the output of the flame rod exceeds "1 (-)" by the first ignition trial. On this account, by setting the upper limit "NMAX" of the number of times of the ignition to about "5 times", it is expected that the combustion of the raw material of the combustor 5 becomes stable without any problem.

Meanwhile, in the case of the ignition operation of the first combustion operation after the replacement of the desulfurizer 4 which is shown by the broken line of FIG. 5, because of the above-described reason, the combustion of the raw material of the combustor 5 becomes stable after about five minutes from the start of the ignition operation. Therefore, in this case, it is anticipated that the output of the flame rod exceeds "1 (−)" by a tenth ignition trial. On this account, by setting the upper limit "NMAX" of the number of times of the ignition to about "15 times", it is expected that the combustion of the raw material of the combustor 5 becomes stable without any problem.

Here, by setting the upper limit "NMAX" of the number of times of the ignition to "15 times" in the ignition sequences of FIGS. 3 and 4, the combustion of the raw material of the combustor 5 can be carried out without any problem in both the ignition operation of the normal combustion operation and the ignition operation of the first combustion operation after the replacement of the desulfurizer 4. However, in a case where the upper limit "NMAX" of the number of times of the ignition is set to "15 times" in the ignition operation of the normal combustion operation even though the combustion of the raw material of the combustor 5 can be stabilized by the first ignition trial, the detection of the abnormality of the combustor 5 other than the ignition failure of the raw material may be delayed. This may prevent the abnormality from being quickly dealt with. Further, this may disturb the restoration of the hydrogen generator 100 and the like.

Figure 6:
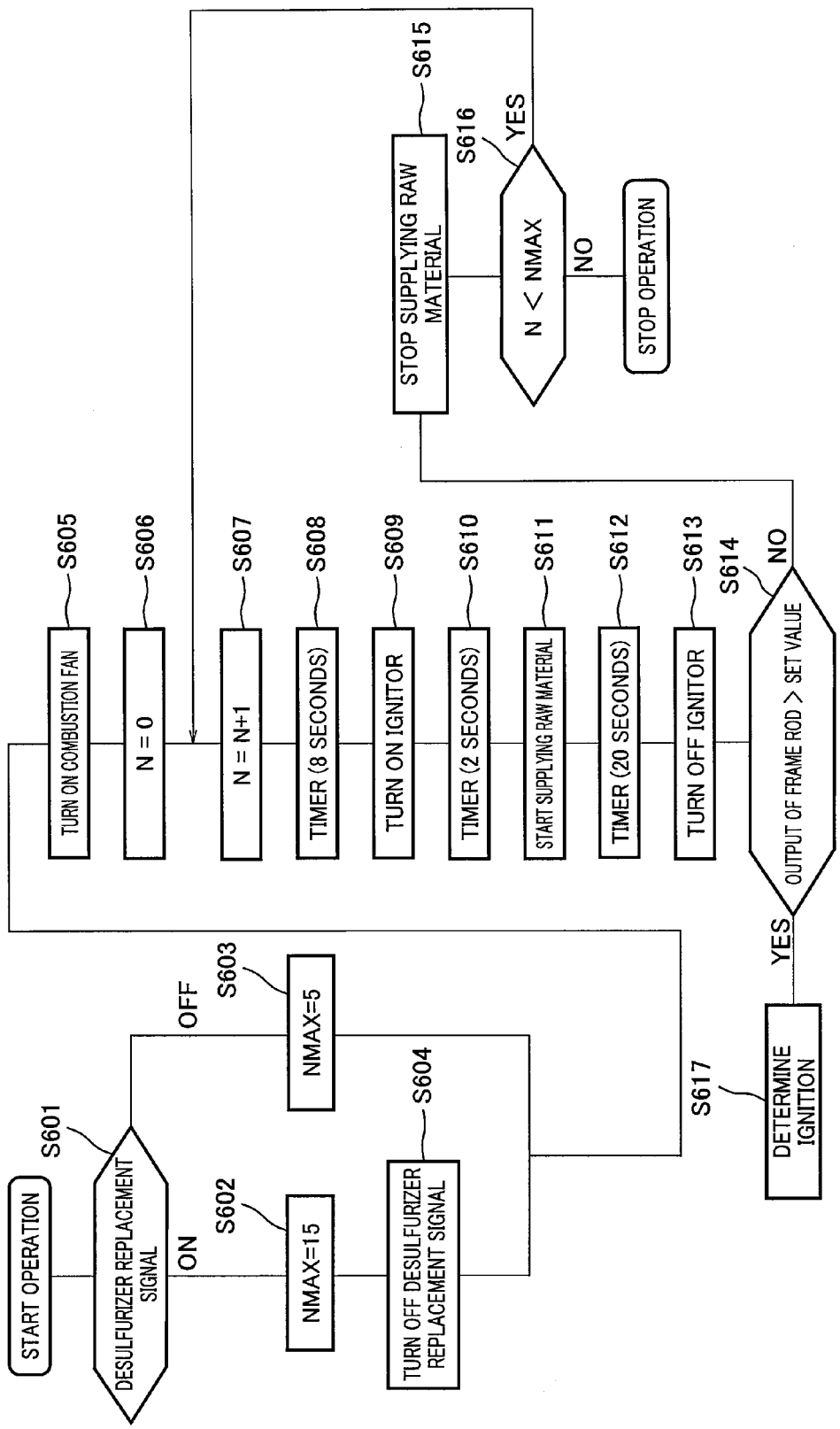
FIG. 6 is a flow chart showing one example of the ignition sequence of the combustor in a case it is assumed that the desulfurizer is replaced.
Figure 8:
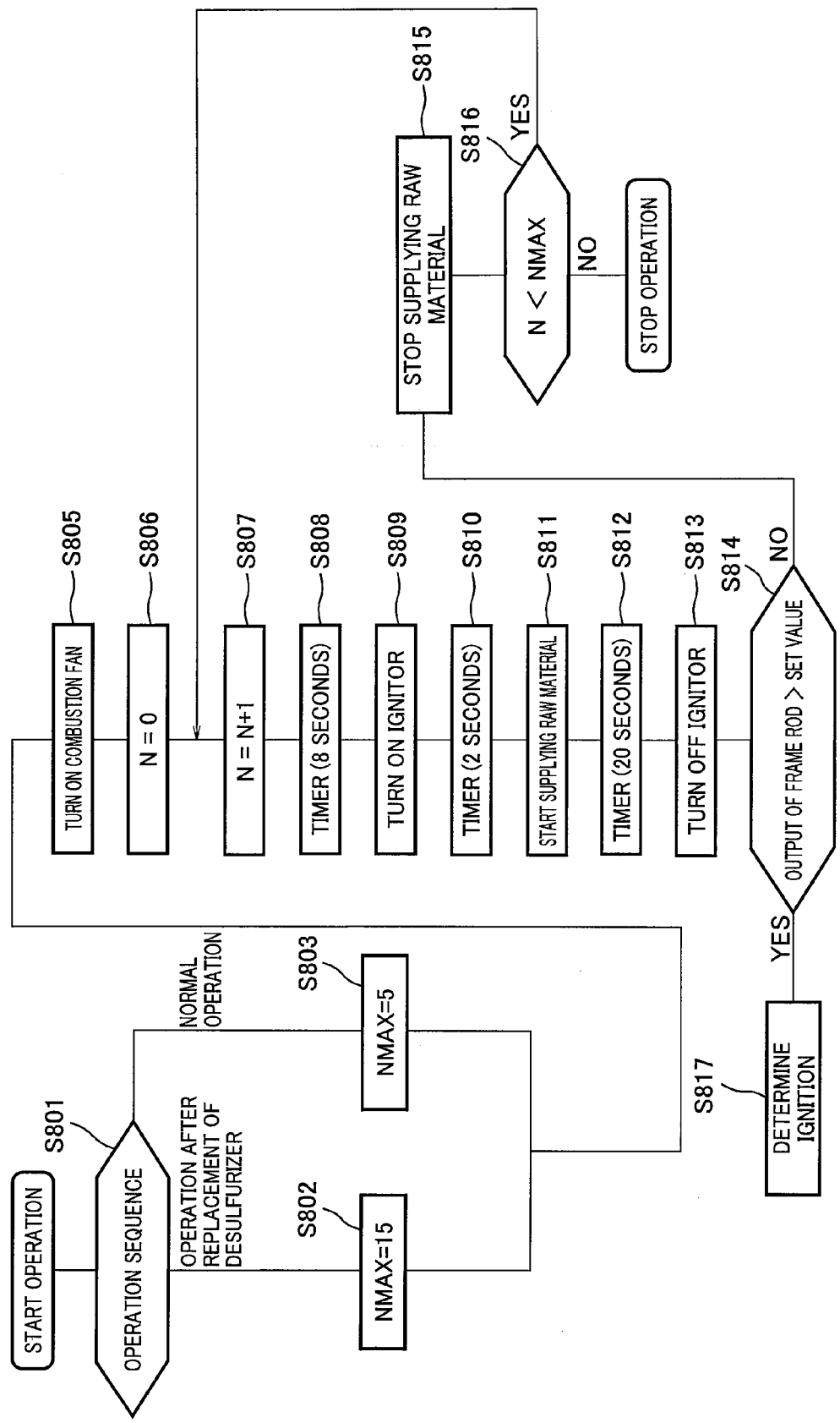
FIG. 8 is a flow chart showing another example of the ignition sequence of the combustor in a case where it is assumed that the desulfurizer is replaced.

Therefore, in the present embodiment, as shown in the ignition sequences of FIGS. 6 and 8, in consideration of the adsorption of the raw material by the desulfurizer 4, the upper limit "NMAX" of the number of times of the ignition is changed from "5 times" to "15 times" in the ignition operation of the first combustion operation after the replacement of the desulfurizer 4.

Figure 7:
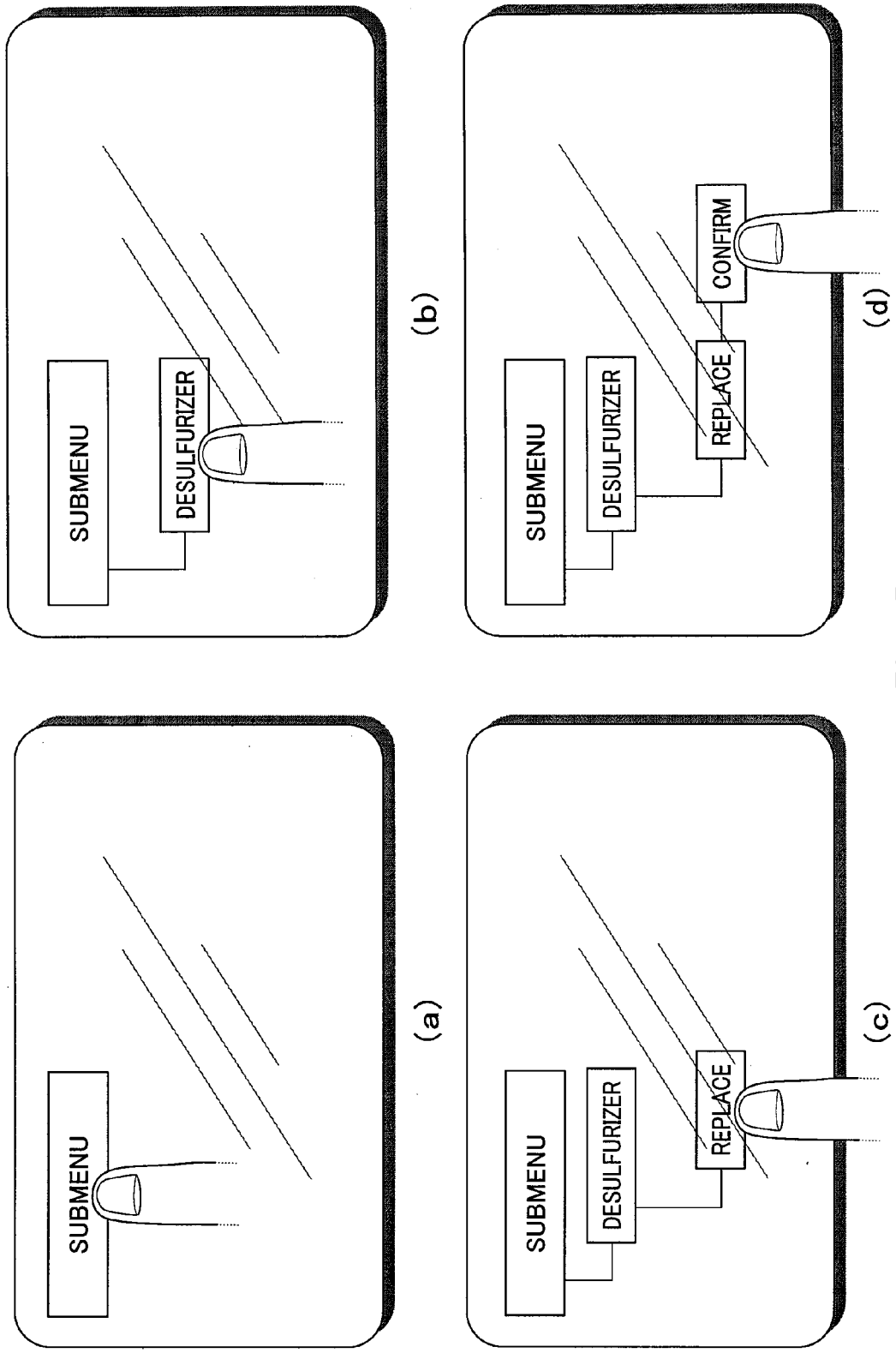
FIG. 7 is a diagram showing a replacement signal receiving device which is one example of an operation screen of a change instruction receiving device in the ignition sequence of FIG. 6.

FIG. 6 is a flow chart showing one example of the ignition sequence of the combustor in a case where the replacement of the desulfurizer is considered. FIG. 7 is a diagram showing a replacement signal receiving device which is one example of the operation screen of the change instruction receiving device in the ignition sequence of FIG. 6.

Figure 9:
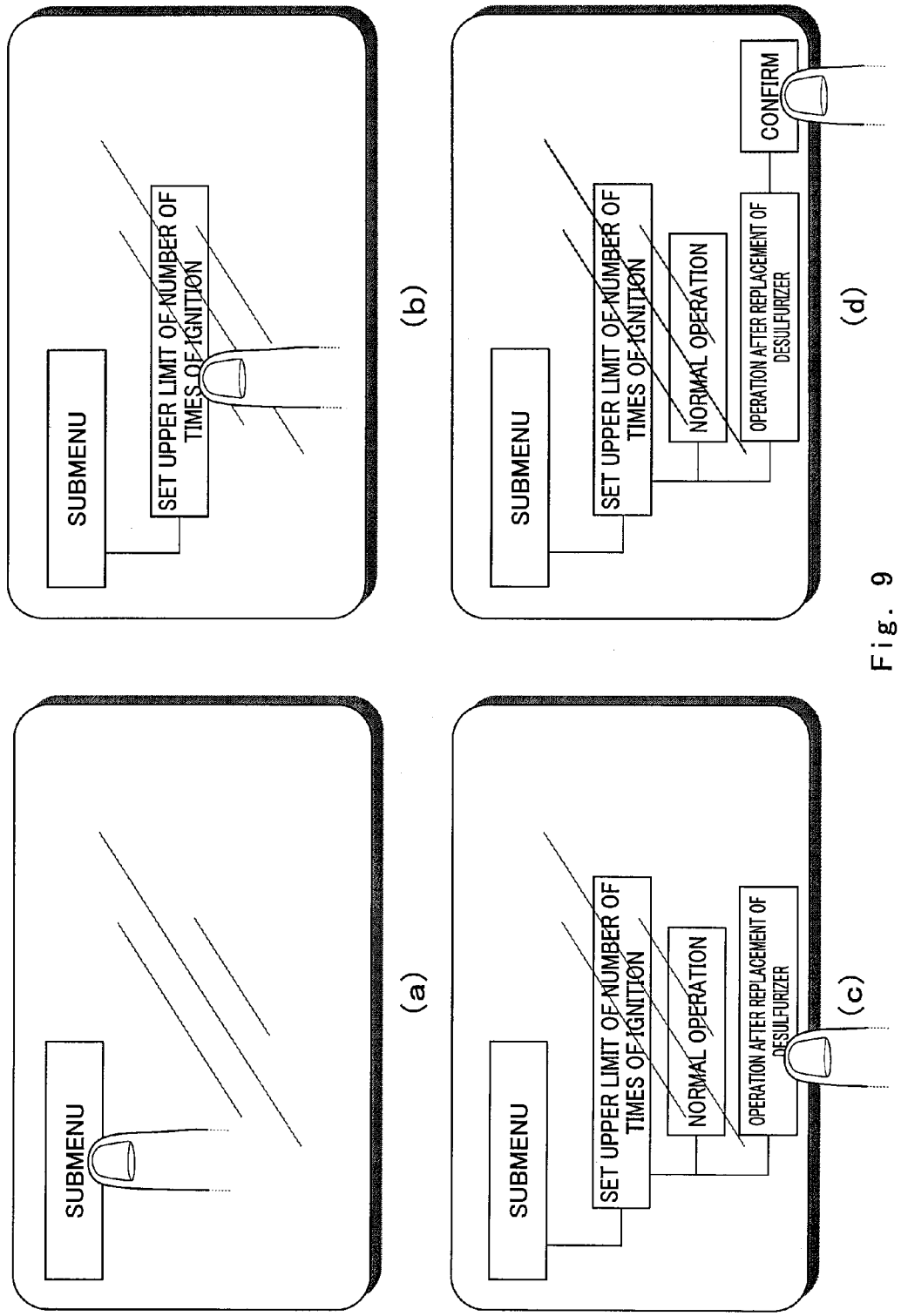
FIG. 9 is a diagram showing one example of the operation screen of the change instruction receiving device in the ignition sequence of FIG. 8.

FIG. 8 is a flow chart showing another example of the ignition sequence of the combustor in a case where the replacement of the desulfurizer is considered. FIG. 9 is a diagram showing one example of the operation screen of the change instruction receiving device in the ignition sequence of FIG. 8.

First, steps of the ignition sequence of FIG. 6 will be explained. Since Steps S605 to S617 of FIG. 6 are the same as Steps S301 to S313 of FIG. 3, explanations thereof are omitted here.

In the ignition sequence of FIG. 6, the control program stored in the internal memory of the control unit 8 is loaded by the CPU of the control unit 8. Then, the CPU controlled by the control program executes the following processing while controlling various devices, such as the hydrogen generator 100 and the like.

The replacement signal receiving device is a touch-panel-type operation screen shown in FIG. 7, and can execute the following processing based on a signal input by an operation of touching the operation screen by the operator.

Herein, the ignition operation of the normal combustion operation is regarded as a standard operation, and therefore an initial value of the upper limit "NMAX" of the number of times of the ignition is set to "5 times". When the operator carries out an operation of replacing the desulfurizer 4, for example, he or she carries out an operation of touching "Submenu" of FIG. 7(a), an operation of touching "Desulfurizer" of FIG. 7(b), and an operation of touching "Replace" on the operation screen shown in FIG. 7(c). After the replacement of the desulfurizer 4 is completed, the operator carries out an operation of touching "Confirm" on the operation screen shown in FIG. 7(d). Then, the internal memory of the control unit 8 stores the data that a desulfurizer replacement signal is "ON". After that, when a start-up command of the hydrogen generator or the fuel cell system including the hydrogen generator is input by the operation of the operator with respect to the operation screen, first, whether the desulfurizer replacement signal is ON or OFF is determined (Step S601).

In a case where the desulfurizer replacement signal is ON in Step S601, this ON signal is input to the CPU of the control unit 8 as a change instruction signal which changes the upper limit of the number of times of the ignition to the upper limit of the number of times of the ignition which corresponds to the first combustion operation after the replacement of the desulfurizer.

In a case where the desulfurizer replacement signal is ON in Step S601, the CPU of the control unit 8 increases the upper limit "NMAX" of the number of times of the ignition based on the desulfurizer replacement ON signal from "5 times" to "15 times" which correspond to the first combustion operation after the replacement of the desulfurizer (Step S602). Then, the desulfurizer replacement signal becomes OFF (Step S604), and the CPU of the control unit 8 executes the operations in and after Step S605.

By the above operation, it is determined that the desulfurizer replacement signal is OFF in Step S601 in the next and following start-up operations, and the CPU of the control unit 8 changes the upper limit "NMAX" of the number of times of the ignition to "5 times" which correspond to the normal combustion operation (Step S603) and executes the operations in and after Step S605.

As described above, the CPU of the control unit 8 changes based on the desulfurizer replacement ON signal received by the replacement signal receiving device in Step S601 the upper limit "NMAX" of the number of times of the ignition which corresponds to the upper limit of "the ignition confirmation time" as in Step S602 to the number of times which is larger than the upper limit of the number of times of the ignition in the normal combustion operation. Therefore, in the present processing, the CPU of the control unit 8 serves as an upper limit changing device which changes the upper limit of the ignition confirmation time, and the replacement signal receiving device serves as the change instruction receiving device 101 which receives a signal related to an instruction of this change.

Next, steps of the ignition sequence of FIG. 8 will be explained. Since Steps S805 to S817 of FIG. 8 are the same as Steps S301 to S313 of FIG. 3, explanations thereof are omitted here.

In the ignition sequence of FIG. 8, the control program stored in the internal memory of the control unit 8 is loaded by the CPU of the control unit 8. Then, the CPU controlled by the control program executes the following processing while controlling various devices, such as the hydrogen generator 100 and the like.

The change instruction receiving device 101 is a touch-panel-type operation screen shown in FIG. 9, and can execute the following processing based on a signal input by the operation of touching the operation screen by the operator.

Herein, the ignition operation of the normal combustion operation is regarded as the standard operation, and therefore the initial value of the upper limit "NMAX" of the number of times of the ignition is set to "5 times".

For example, the operator carries out an operation of touching "Submenu" of FIG. 9(a), an operation of touching "Set Upper Limit of Number of Times of Ignition" of FIG. 9(b), and an operation of touching "Operation After Replacement of Desulfurizer" on the operation screen shown in FIG. 9(c). After the replacement of the desulfurizer 4 is completed, the operator carries out an operation of touching "Confirm" on the operation screen shown in FIG. 9(d). Then, the internal memory of the control unit 8 stores the data that the operation sequence is "Operation After Replacement of Desulfurizer". After that, when the start-up command of the hydrogen generator or the fuel cell system including the hydrogen generator is input by the operation of the operator with respect to the operation screen, first, whether the operation sequence is the operation after the replacement of the desulfurizer or the normal operation is determined (Step S801).

In a case where the operation sequence is the operation after the replacement of the desulfurizer in Step S801, a signal indicating "Operation After Replacement of Desulfurizer" is input to the CPU of the control unit 8 as the change instruction signal which changes the upper limit of the number of times of the ignition to the upper limit of the number of times of the ignition which corresponds to the first combustion operation after the replacement of the desulfurizer.

Moreover, in a case where the operation sequence is the operation after the replacement of the desulfurizer in Step S801, the CPU of the control unit 8 increases the upper limit "NMAX" of the number of times of the ignition based on the change instruction signal from "5 times" to "15 times" which correspond to the first combustion operation after the replacement of the desulfurizer (Step S802). Then, the CPU of the control unit 8 executes the operations in and after Step S805.

Meanwhile, after the operations of the hydrogen generator and the like including the first combustion operation after the replacement of the desulfurizer 4 are completed, the operator carries out an operation of touching "Normal Operation" on the operation screen shown in FIG. 9(c). Then, the operation sequence becomes "Normal Operation" in Step S801, and in the next and following start-up operations, the CPU of the control unit 8 returns the upper limit "NMAX" of the number of times of the ignition to "5 times" which correspond to the normal combustion operation in Step S801 (Step S803). Then, the CPU of the control unit 8 executes the operations in and after Step S805.

As described above, the CPU of the control unit 8 changes based on the change instruction signal received by the change instruction receiving device 101 in Step S801 the upper limit "NMAX" of the number of times of the ignition which corresponds to the upper limit of "the ignition confirmation time" as in Step S802. Therefore, in the present processing, the CPU of the control unit 8 serves as the upper limit changing device which changes the upper limit of the ignition confirmation time.

As described above, the hydrogen generator 100 and the like of the present embodiment includes the upper limit changing device which changes the upper limit "NMAX" of the number of times of the ignition of the ignitor 103 and the change instruction receiving device 101 which receives the signal related to the instruction of the change. Specifically, the present embodiment is configured such that in a case where the operator selects "Operation After Replacement of Desulfurizer", and the change instruction receiving device 101 receives the change instruction signal which changes the upper limit of the number of times of the ignition to the upper limit of the number of times of the ignition which corresponds to the first combustion operation after the replacement of the desulfurizer, the CPU of the control unit 8 as the upper limit changing device increases the upper limit "NMAX" of the number of times of the ignition from "5 times" to "15 times".

With this, in the hydrogen generator 100 and the like in which the combustion of the combustor 5 is started by using the raw material passed through the adsorptive desulfurizer, the combustion can be appropriately started without erroneously determining the combustion as the combustion failure even in the start-up operation after the replacement of the desulfurizer 4.

To be specific, since the desulfurizing agent which is not exposed to the raw material after the replacement of the desulfurizer 4 has the high adsorption ability, the sulfur compound in the raw material and, in addition, a part of the raw material itself adsorb to the desulfurizing agent when the raw material flows first. Therefore, the amount of the raw material supplied to the combustion space 52 is reduced, and the time until the mixture gas of the raw material and the combustion air enters into the combustible range in the combustion space 52 (to be specific, time until the output of the flame rod exceeds "1 (−)") increases. On this account, by setting the upper limit "NMAX" of the number of times of the ignition to an adequately large number of times, i.e., about "15 times" in the ignition operation of the first combustion operation after the replacement of the desulfurizer 4, it is expected that the combustion of the raw material of the combustor 5 becomes stable without any problem. In contrast, by setting the upper limit "NMAX" of the number of times of the ignition to an adequately small number of times, i.e., about "5 times" in the ignition operation of the normal combustion operation, it is possible to quickly detect the abnormality of the combustor 5 other than the ignition failure of the raw material. With this, it is possible to quickly and appropriately deal with the abnormality, such as to carry out the return operation.

The amount of the raw material adsorbing to the desulfurizing agent in the desulfurizer 4 changes depending on the type of the desulfurizing agent and the amount of the desulfurizing agent which is filled in the desulfurizer 4. In addition, the time taken to supply the raw material from the raw material supplying unit 3 to the combustor 5 and the timing of when the output of the flame rod exceeds "1 (−)" change depending on the configurations of the hydrogen generator 100 and the like. On this account, a specific numerical value of the upper limit "NMAX" of the number of times of the ignition, the timer setting time, and the like need to be set suitably for each device.

Modification Example 1

Figure 10:
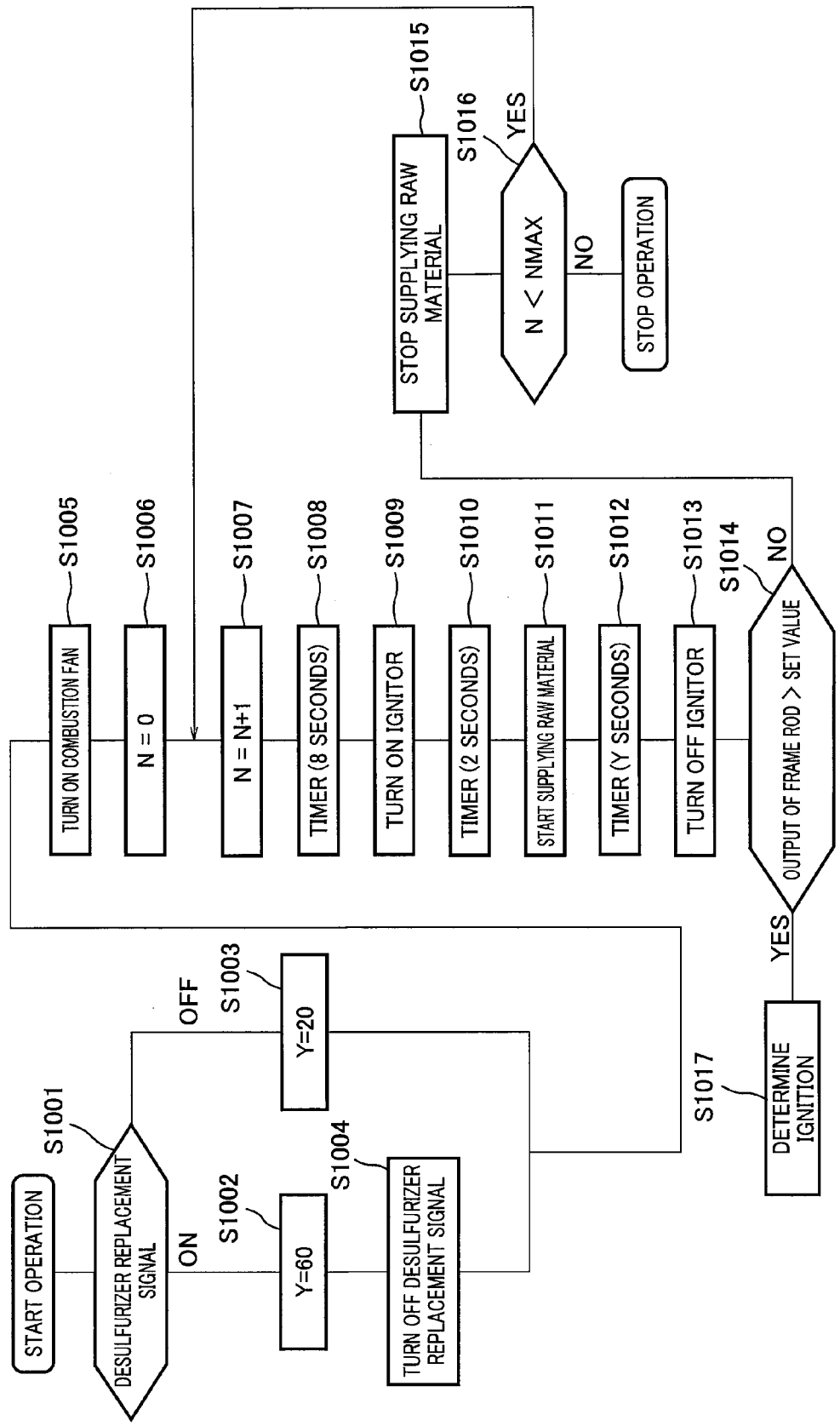
FIG. 10 is a flow chart showing a modification example of the ignition sequence of the combustor.

FIG. 10 is a flow chart showing a modification example of the ignition sequence of the combustor.

The present embodiment has described an example in which the upper limit "NMAX" of the number of times of the ignition of the ignitor 103 in the hydrogen generator 100 and the like is changed. Instead of this, as shown in FIG. 10, a timer setting time "Y seconds" in Step S1012 may be changed, which is a time (time from Step S1011 to Step S1013) during which the ignitor 103 operates with respect to the raw material passed through the desulfurizer 4 and supplied to the combustor 5. Herein, the ignition operation in the normal combustion operation is regarded as the standard operation, the upper limit "NMAX" of the number of times of the ignition is set to "5 times", and the initial value of the timer setting time "Y seconds" is set to "20 seconds".

As shown in FIG. 10, after the operator carries out the operation of FIG. 7(c) when replacing the desulfurizer, the start-up command of the hydrogen generator or the fuel cell system including the hydrogen generator is input. When the desulfurizer replacement signal is ON in Step S1001, the CPU of the control unit 8 increases the timer setting time "Y seconds" from "20 seconds" to "60 seconds" based on the desulfurizer replacement signal (Step S1002).

Meanwhile, after the timer setting time is changed in Step S1002, the desulfurizer replacement signal becomes OFF. Therefore, in the next and following start-up operations, it is determined that the desulfurizer replacement signal is OFF in Step S1001, and the CPU of the control unit 8 sets the timer setting time "Y seconds" to "20 seconds" (Step S1003). Then, the CPU of the control unit 8 executes the operations in and after Step S1005.

With this, in the hydrogen generator 100 and the like in which the combustion of the combustor 5 is started by using the raw material passed through the adsorptive desulfurizer 4, the combustion can be appropriately started without erroneously determining the combustion as the combustion failure even in the first start-up operation after the replacement of the desulfurizer 4.

To be specific, in a case where the ignition operation time of each ignition trial of the ignitor 103 with respect to the raw material passed through the desulfurizer 4 and supplied to the combustor 5 is increased in the ignition operation of the first combustion operation after the replacement of the desulfurizer 4, the same effect as in a case where the upper limit "NMAX" of the number of times of the ignition is increased can be obtained. In this case, adopted as the upper limit of "the ignition confirmation time" of the ignitor 103 is a numerical value obtained by multiplying the timer setting time "Y seconds" by the upper limit "NMAX" of the number of times of the ignition.

Modification Example 2

Figure 11:
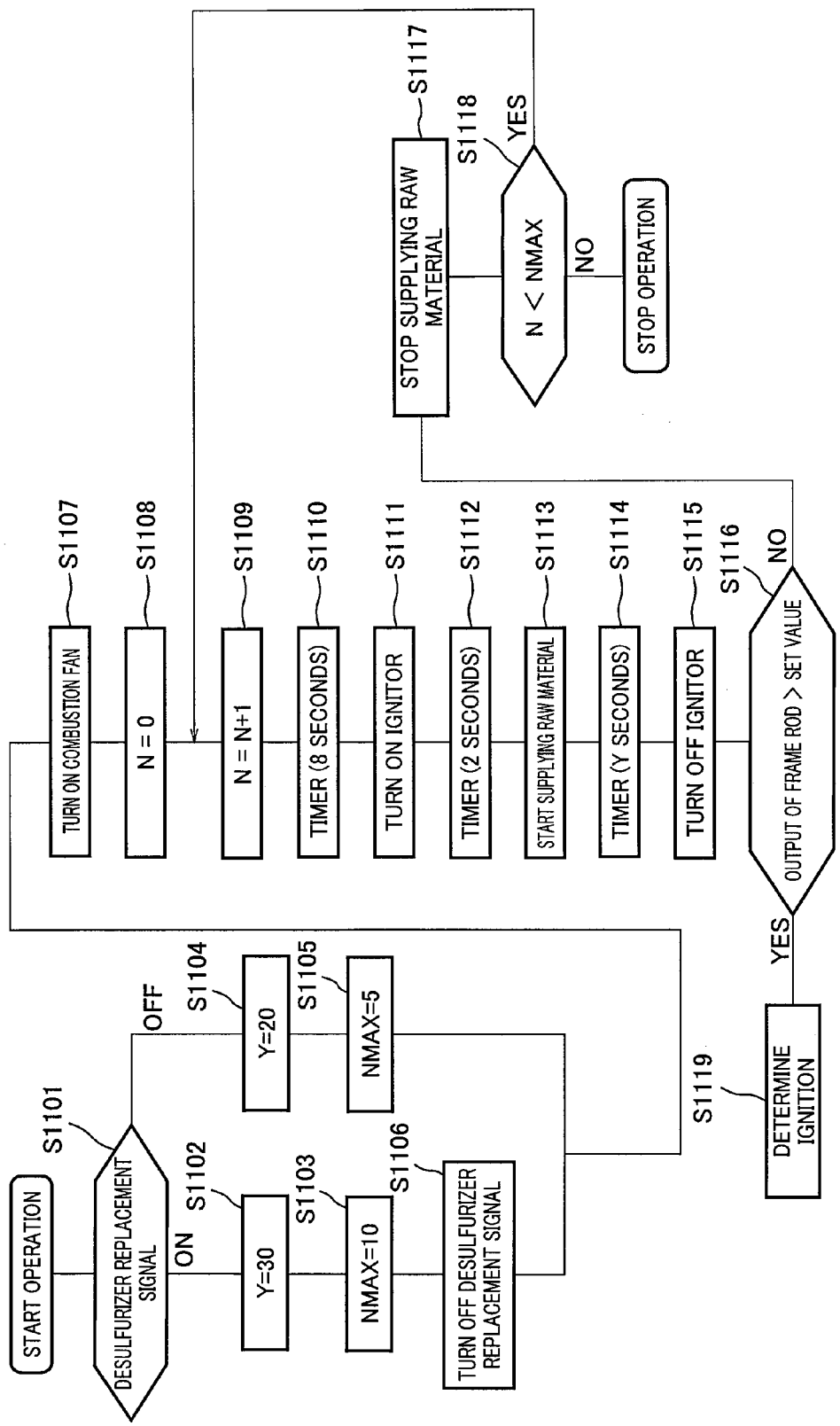
FIG. 11 is a flow chart showing another modification example of the ignition sequence of the combustor.

FIG. 11 is a flow chart showing another modification example of the ignition sequence of the combustor.

The present embodiment has described an example in which the upper limit "NMAX" of the number of times of the ignition of the ignitor 103 is changed in the hydrogen generator 100 and the like. Instead of this, as shown in FIG. 11, the upper limit "NMAX" of the number of times of the ignition may be changed, and the timer setting time "Y seconds" in Step S1114 may be changed, which is the time (time from Step S1113 to Step S1115) during which the ignitor 103 operates with respect to the raw material passed through the desulfurizer 4 and supplied to the combustor 5. Herein, the ignition operation in the normal combustion operation is regarded as the standard operation, and therefore the initial value of the upper limit "NMAX" of the number of times of the ignition is set to "5 times", and the initial value of the timer setting time "Y seconds" is set to "20 seconds".

As shown in FIG. 11, after the operator carries out the operation of FIG. 7(c) when replacing the desulfurizer, the start-up command of the hydrogen generator or the fuel cell system including the hydrogen generator is input. When the desulfurizer replacement signal is ON in Step S1101, the CPU of the control unit 8 increases the timer setting time "Y seconds" from "20 seconds" to "30 seconds" and increases the upper limit "NMAX" of the number of times of the ignition from "5 times" to "10 times" based on the desulfurizer replacement signal (Steps S1102 and S1103).

Meanwhile, after the timer setting time and the upper limit of the number of times of the ignition are changed in Step S1102 and S1103, the desulfurizer replacement signal becomes OFF. Therefore, in the next and following start-up operations, it is determined that the desulfurizer replacement signal is OFF in Step S1101, and the CPU of the control unit 8 sets the timer setting time "Y seconds" to "20 seconds" and sets the upper limit "NMAX" of the number of times of the ignition to "5 times" (Steps S1104 and S1105). Then, the CPU of the control unit 8 executes the operations in and after Step S1107.

With this, in the hydrogen generator 100 and the like in which the combustion of the combustor 5 is started by using the raw material passed through the adsorptive desulfurizer 4, the combustion can be appropriately started without erroneously determining the combustion as the combustion failure even in the first start-up operation after the replacement of the desulfurizer 4.

To be specific, the above-described effect can be obtained in a case where the ignition operation time of each ignition trial of the ignitor 103 with respect to the raw material passed through the desulfurizer 4 and supplied to the combustor 5 is increased and the upper limit "NMAX" of the number of times of the ignition is increased in the ignition operation of the first combustion operation after the replacement of the desulfurizer 4. In this case, adopted as the upper limit of "the ignition confirmation time" of the ignitor 103 is the numerical value obtained by multiplying the timer setting time "Y seconds" by the upper limit "NMAX" of the number of times of the ignition.

Modification Example 3

The above embodiment has exemplified the touch-panel-type operation screen as the replacement signal receiving device. However, the acquisition of the replacement signal of the desulfurizer 4 using the touch panel is just one example. In Modification Example 3, for example, the replacement signal receiving device may be a sensor which detects the replacement of the desulfurizer 4 by a mechanical contact switch. Moreover, the replacement of the desulfurizer 4 may be detected by using an IC tag and an IC tag reader, or the like.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

INDUSTRIAL APPLICABILITY

The hydrogen generator of the present invention is useful in, for example, a domestic fuel cell cogeneration system including the hydrogen generator capable of appropriately starting the combustion using the raw material passed through the desulfurizer without erroneously determining the combustion as the combustion failure even in the start-up operation after the replacement of the desulfurizer.

The invention claimed is:

1. A method for operating a hydrogen generator comprising:
removing a sulfur compound in a raw material, the sulfur compound being adsorbed to a desulfurizer including a desulfurizing agent;
generating a hydrogen-containing gas from the raw material passed through the desulfurizer in a reformer including a reforming catalyst;

igniting the raw material by an ignitor in a combustor which heats the reformer;

starting combustion in the combustor by using the raw material passed through the desulfurizer;

increasing an upper limit of an ignition confirmation time of the ignitor after replacement of the desulfurizer, said ignition confirmation time corresponds to the time said ignitor is provided to attempt to ignite said raw material; and carrying out an ignition operation of the ignitor based on the increased upper limit of the ignition confirmation time, wherein the ignition confirmation time is set to a first upper limit when the desulfurizer has been replaced, and the ignition confirmation time is set to a second upper limit, which is less than the first upper limit, when the desulfurizer has not been replaced.

2. A method for operating a fuel cell system comprising:

removing a sulfur compound in a raw material, the sulfur compound being adsorbed to a desulfurizer including a desulfurizing agent;

generating a hydrogen-containing gas from the raw material passed through the desulfurizer in a reformer including a reforming catalyst;

igniting the raw material by an ignitor in a combustor which heats the reformer;

starting combustion in the combustor by using the raw material passed through the desulfurizer;

increasing an upper limit of an ignition confirmation time of the ignitor after replacement of the desulfurizer, said ignition confirmation time corresponds to the time said ignitor is provided to attempt to ignite said raw material;

carrying out an ignition operation of the ignitor based on the increased upper limit of the ignition confirmation time; and generating electric power, by a fuel cell, using the hydrogen-containing gas, wherein the ignition confirmation time is set to a first upper limit when the desulfurizer has been replaced, and the ignition confirmation time is set to a second upper limit, which is less than the first upper limit, when the desulfurizer has not been replaced.

3. The method for operating a fuel cell system according to claim 1, further comprising receiving a desulfurizer replacement signal, which indicates if the desulfurizer has been replaced, wherein when the desulfurizer replacement signal indicates the desulfurizer has been replaced, the ignition confirmation time of the ignitor is set to the first upper limit, and when the desulfurizer replacement signal indicates the desulfurizer has not been replaced, the ignition confirmation time is set to the second upper limit.

4. The method for operating a fuel cell system according to claim 2, further comprising receiving a desulfurizer replacement signal, which indicates if the desulfurizer has been replaced, wherein when the desulfurizer replacement signal indicates the desulfurizer has been replaced, the ignition confirmation time of the ignitor is set to the first upper limit, and when the desulfurizer replacement signal indicates the desulfurizer has not been replaced, the ignition confirmation time is set to the second upper limit.

* * * * *